J. H. SHAW.
PIN TUMBLER LOCK HAVING INTERCHANGEABLE CYLINDER EXTENSIONS.
APPLICATION FILED NOV. 24, 1911.
1,027,777.
Patented May 28, 1912.
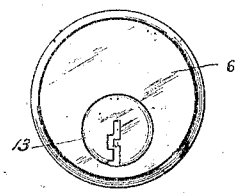
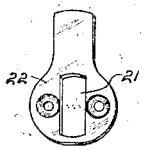
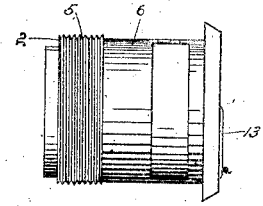
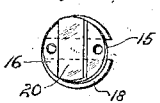
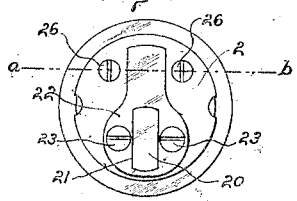
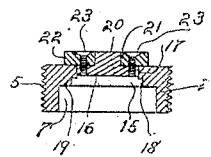
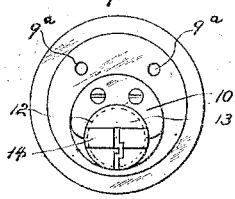
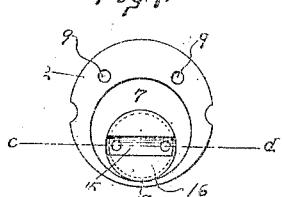
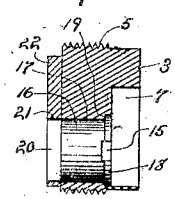
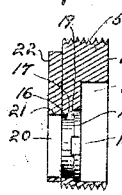
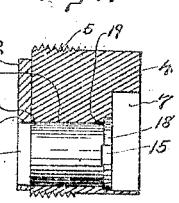
Inventor
John H. Shaw
by Seymour Earle
Atty
Witnesses
M. P. Nichols
C. L. Weed

UNITED STATES PATENT OFFICE.

JOHN H. SHAW, OF NEW HAVEN, CONNECTICUT, ASSIGNOR TO SARGENT & CO., OF NEW HAVEN, CONNECTICUT, A CORPORATION.

PIN-TUMBLER LOCK HAVING INTERCHANGEABLE CYLINDER EXTENSIONS.

1,027,777.   Specification of Letters Patent.   Patented May 28, 1912.

Application filed November 24, 1911. Serial No. 662,124.

*To all whom it may concern:*

Be it known that I, JOHN H. SHAW, a citizen of the United States, residing at New Haven, in the county of New Haven and State of Connecticut, have invented a new and useful Improvement in Pin-Tumbler Locks Having Interchangeable Cylinder Extensions; and I do hereby declare the following, when taken in connection with the accompanying drawings and the characters of reference marked thereon, to be a full, clear, and exact description of the same, and which said drawings constitute part of this specification, and represent, in—

Figure 1 a view in front elevation of an extensible pin-tumbler lock constructed in accordance with my invention. Fig. 2 a view thereof in side elevation showing its provision with the shortest of its extensions. Fig. 3 a view thereof in rear elevation. Fig. 4 a view thereof in vertical longitudinal section. Fig. 5 a view thereof in horizontal section on the line *a—b* of Fig. 2. Fig. 6 a view thereof in rear elevation with the extension removed. Fig. 7 a detached view in inside elevation of the extension. Fig. 8 a detached view of the extension in horizontal section on the line *c—d* of Fig. 7. Fig. 9 a detached perspective view of the bit. Fig. 10 a detached perspective view of the supplemental plug. Fig. 11 a detached plan view of the plug-retaining-plate. Fig. 12 a detached view in vertical section of the short extension. Fig. 13 a corresponding view of the intermediate extension. Fig. 14 a corresponding view of the long extension.

My invention relates to an improvement in extensible pin-tumbler locks, whether of the common single type, or the duplex type shown in my Patent No. 830,013 dated September 4th, 1906, the object of my present invention being to adapt single or duplex pin-tumbler locks to be extended as required to fit doors of different thickness without any change whatever in the tumbler-mechanism of the locks which undergo no departure from standardization in being provided with my improvement.

With these ends in view, my invention consists in a pin-tumbler lock having a series of interchangeable extensions differentiated from each other in length but alike at their respective ends.

My invention further consists in an extensible pin-tumbler lock having certain details of construction and combinations of parts as will be hereinafter described and pointed out in the claims.

For the purpose of illustrating my invention, I have shown it as applied to a single pin-tumbler lock, but it may be applied in precisely the same way to a duplex pin-tumbler lock which I deem it unnecessary to show or describe, since in either case the pin-tumbler mechanism remains unchanged.

In carrying out my invention as herein shown, I employ three interchangeable extensions 2, 3 and 4, having like ends and differentiated from each other only in length, or, in other words, in their intermediate portions, each section being provided with circumferential threads 5 for the connection of the cylinder 6 of the pin-tumbler lock to the bolt-mechanism or lock proper which is mortised into the door in the ordinary manner, and which may be of any approved construction and is unaffected by my present invention and therefore not shown or described herein.

I may here state that while I have, in order to follow the nomenclature of the United States Patent Office, spoken of my improvement as an improvement in pin-tumbler locks, the mechanism to which my particular invention relates is generally known to the trade, as a pin-tumbler cylinder. I wish it also understood that although I have shown only three interchangeable extensions 2, 3 and 4, this number may be varied according to the requirements of the trade, I shall hereafter refer to them respectively, as the short, intermediate and long extensions.

Pin-tumbler lock cylinders are at present ordered by the trade, for the most part, to be made up with cylinders of the right length to make the locks suitable for application to doors of predetermined thickness. This is objectionable as it prevents the complete standardization of the locks and obliges the maker to keep on hand cylinders of varying lengths, whereas, under my invention the cylinder portion of the lock is a constant factor and remains in every respect unchanged; but self-contained extensions of different length are provided for being interchanged with it as ordered.

The inner face of each of the extensions 2, 3 and 4 is formed with a counterbore 7 located below the axial center of the extension and adapted in size to fit closely over an annular positioning shoulder 8 formed upon and projecting from the inner end of the cylinder, below the center thereof, whereby each extension is centered with respect to the cylinder to which it conforms in diameter, the extensions being rigidly secured to the cylinder by screws 26 (Fig. 5) located opposite each other and extending from rear to front through screw-holes 9, (Fig. 7) formed in the extensions and entering screw-holes 9² (Fig. 6) formed in the rear face of the cylinder. A plug-retaining plate 10 (Fig. 11) secured to the shoulder 7 by screws 11, enters a groove 12 near the inner end of the plug 13 and provides for holding the same against longitudinal displacement in the cylinder 6 without interfering with its free rotation therein.

At its extreme rear end the plug 13 is formed with a transversely arranged coupling-lug 14 which enters a corresponding groove 15 extending transversely across the inner face of a supplemental plug 16 rotatably mounted in each of the extensions 2, 3 and 4, by being located in a circular opening 17 leading out of the bottom of the counterbore 7 of each extension. Each supplemental plug 16 is furnished at its inner end with an annular retaining-shoulder 18 which bears upon an annular bearing-shoulder 19 formed between the counterbore 7 and the circular opening 17 of each extension. The outer end of each supplemental plug 16 is formed with a coupling-lug 20 arranged at a right angle to the groove 15 in its inner face and entering a coupling-slot 21 formed in the body of each bit 22, the respective bits being secured to the supplemental plugs 16 by screws 23.

Each of the interchangeable extensions 2, 3 and 4 will be provided with a standard bit 22, but in the several extensions the supplemental plugs 16 will vary in length in accordance with the length of the extensions. Beyond these two differences, namely, the length of the extension and the length of the supplemental plug, all of the interchangeable extensions are alike.

As shown, the pin-tumbler lock cylinder 6 is provided with five two-part tumblers 24 each of which is operated by a spring 25, all of ordinary construction.

It will be seen from the foregoing that by means of my invention, I am enabled to employ a standard cylinder whether single or duplex, and adapt it to the requirements of doors of any thickness by providing it with a standard extension chosen for its length from a series of interchangeable extensions.

The construction of my improved pin-tumbler cylinder lock is not only simple and reliable, but provides for the ready adaptation of these locks to doors varying widely in thickness without interfering with their cylinders which remain a constant factor. As already explained, the application of my invention to duplex locks, is effected in precisely the way herein described. Also I do not limit myself to pin-tumbler locks of any particular construction, nor to the use of any number of interchangeable extensions.

I claim:—

1. A pin-tumbler lock cylinder provided with a rotatable plug extending longitudinally through it, the cylinder being formed at its inner end with a positioning-shoulder provided to position any one of a series of interchangeable, externally threaded cylinder-extensions substantially corresponding to the cylinder in diameter and differentiated in length but alike at their respective ends.

2. As a new article of manufacture, a cylinder-extension for pin-tumbler locks, the said extension having circumferential threads and provided with a bit, and with a supplemental plug for being coupled with the plug of the cylinder lock.

3. In an extensible pin-tumbler lock, the combination with the cylinder thereof, of a rotatable plug mounted in the said cylinder, an externally threaded cylinder-extension substantially corresponding to the said cylinder in diameter and adapted to be removably attached to the inner end thereof, and a supplemental plug rotatably mounted in the cylinder-extension and adapted to be coupled with the rotatable plug mounted in the cylinder proper.

4. The combination with a pin-tumbler lock cylinder, of a cylinder-extension having external circumferential threads and provided with a bit and with a supplemental plug secured to the said bit and adapted to be coupled with the plug of the cylinder, and means for securing the said extension to the rear end of the cylinder.

5. The combination with a pin-tumbler lock cylinder, of a cylinder-extension having the face of its inner end counterbored to fit over the projecting plug of the cylinder, a supplemental plug mounted in the cylinder-extension and adapted to be coupled with the rear end of the plug of the cylinder, and a bit secured to the supplemental plug.

6. The combination with a pin-tumbler lock cylinder, of a series of interchangeable cylinder-extensions differentiated in length but alike at their ends, each of the said extensions being formed with external threads and each being provided with a supplemental plug adapted to be coupled with the plug of the cylinder, and with a bit fastened to the said supplemental plug, the said cylinder-extensions and their supplemental plugs varying in length.

7. A cylinder extension for the cylinders of pin-tumbler locks, the said extension corresponding in diameter to the cylinder which it is designed to extend and provided with external threads, with a bit and with a supplemental plug carrying the said bit at its outer end and adapted at its inner end to be coupled with the inner end of the plug of the lock.

In testimony whereof, I have signed this specification in the presence of two subscribing witnesses.

JOHN H. SHAW.

Witnesses:
SYDNEY SARGENT,
BERTHA RAY.